United States Patent [19]

Inman et al.

[11] Patent Number: 5,140,802

[45] Date of Patent: Aug. 25, 1992

[54] GRAIN BAGGING MACHINE AND METHOD

[75] Inventors: Larry R. Inman, Warrenton, Oreg.; Lester B. Merrill, Portales, N. Mex.; Patrick S. Welch, Astoria, Oreg.

[73] Assignee: Ag-Bag Corporation, Warrenton, Oreg.

[21] Appl. No.: 671,386

[22] Filed: Mar. 19, 1991

[51] Int. Cl.⁵ .................... B65B 1/06; B65B 43/26
[52] U.S. Cl. ................................ 53/459; 53/473; 53/570; 53/255; 141/114; 141/231
[58] Field of Search ............. 53/255, 258, 459, 469, 53/473, 567, 576, 570; 141/114, 231, 390, 391

[56] References Cited

U.S. PATENT DOCUMENTS

| | | | |
|---|---|---|---|
| Re. 31,810 | 1/1985 | Lee | 141/114 |
| 3,687,061 | 8/1972 | Eggenmuller et al. | 53/576 X |
| 4,046,068 | 9/1977 | Eggenmuller et al. | 141/114 X |
| 4,337,805 | 7/1982 | Johnson et al. | 53/576 X |
| 4,484,606 | 11/1984 | Kosters | 141/114 |
| 4,653,553 | 3/1987 | Cox et al. | 141/114 |
| 4,672,794 | 6/1987 | Good | 53/576 X |
| 4,945,715 | 8/1990 | Brodecht | 53/576 X |

*Primary Examiner*—John Sipos
*Assistant Examiner*—Linda B. Johnson
*Attorney, Agent, or Firm*—Robert L. Harrington

[57] ABSTRACT

A machine is provided with a movable chassis having adjustable brakes and a grain container having a rear tunnel defining a rear opening. A pliable plastic bag is fit to the tunnel with the bag bottom closing the opening. A bin on the chassis receives grain, e.g., from a truck and an auger transports the grain from the bin to an elevated position in the container that is above the height of the filled bag. The adjustable brakes are set to establish the level of grain pile in the container to cover the opening and thereby fill the bag. The brakes are independently controlled to provide limited steering.

14 Claims, 5 Drawing Sheets

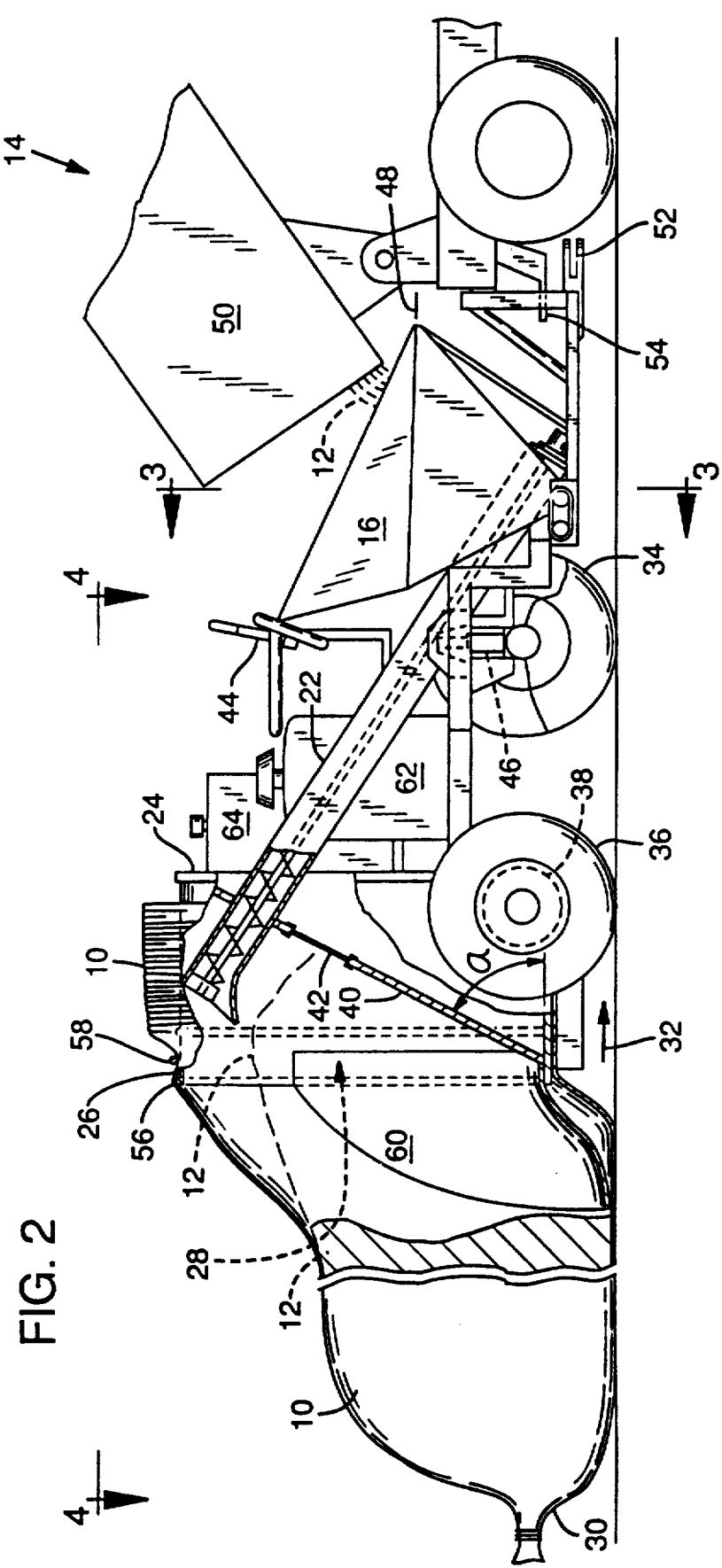

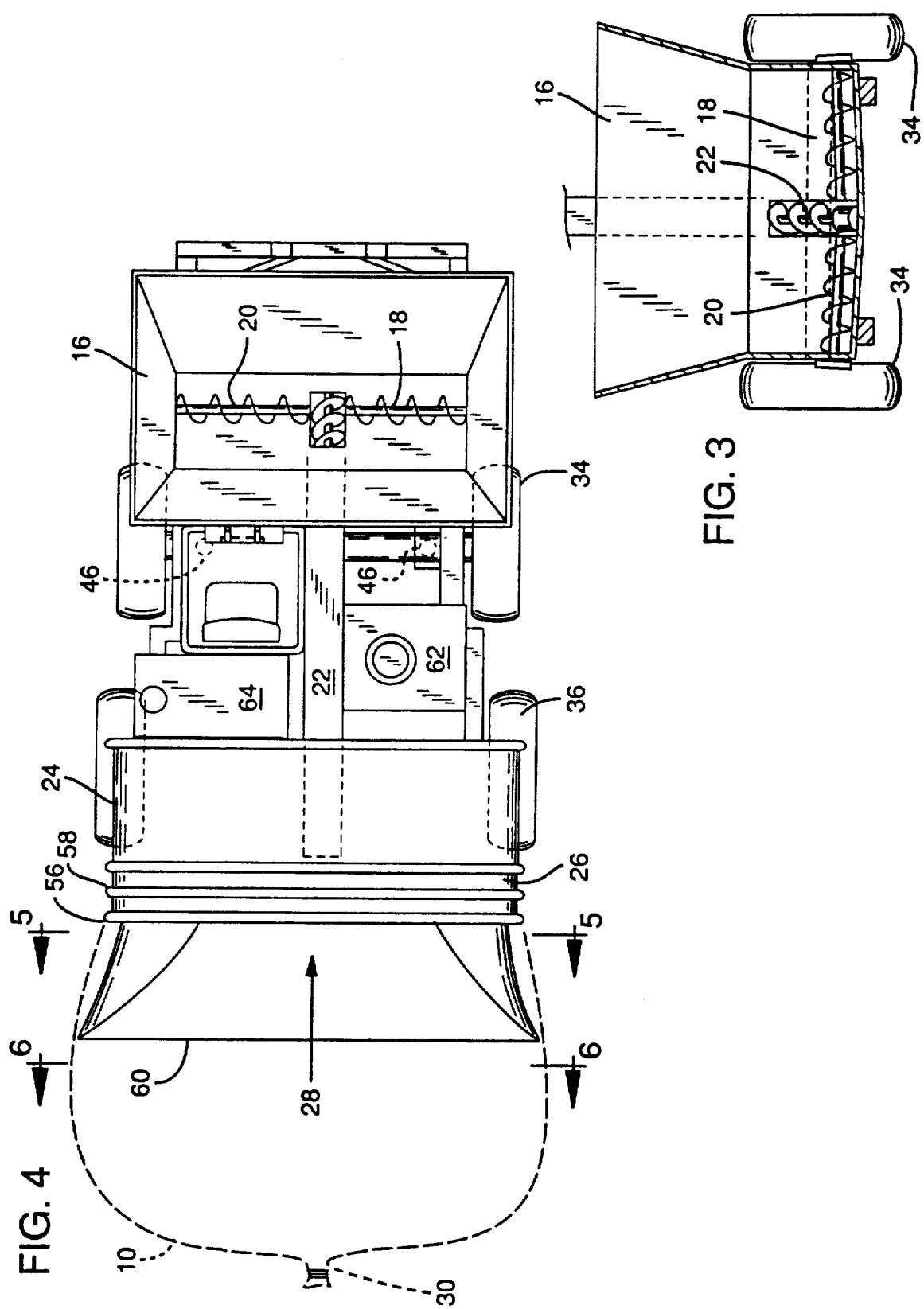

5,140,802

GRAIN BAGGING MACHINE AND METHOD

FIELD OF THE INVENTION

This invention relates to a method and machine for filling large pliable bags with grain.

BACKGROUND OF THE INVENTION

Farmers who raise grain crops often have need for storage facilities for their grain. It is very common for farmers to build and maintain permanent building structures for this purpose. The cost of such structures is high and the lack of sufficient storage space can result in a farmer having to sell his grain crop prematurely at a significant loss in revenue.

A similar problem was addressed some years ago for cattle or dairy farmers having to store silage used to feed cattle, e.g. in the winter. In a manner similar to grain storage, huge permanent structures called silos were commonplace on dairy and cattle farms. However, the cattle farmer was provided with a solution. A method of storing silage in large plastic bags was developed as well as the equipment for accomplishing the new method. A movable machine is equipped with a feed rotor and a huge folded plastic bag that, when unfolded, extends, e.g. to a size of 8 feet in diameter and 200 feet in length. Silage is fed to the rotor and the rotor compacts the silage into the bag. The bag unfolds from the machine as the machine moves away from the bag in response to filling of the bag. The unfolding or extension of the bag and the movement of the machine must be controlled to insure proper filling of the bag. This is accomplished by a stop positioned behind the bag to prevent rearward sliding and a brake mechanism on the machine that can be adjusted to resistively release in response to the pressure that is created as the rotor compresses the silage against the stop, i.e., the machine is pushed forward by force feeding the silage into the bag and against the stop. The force required to move the machine against the resistance by the brake is established as that force required to satisfactorily fill the bag. Numerous patents have been issued based on this concept. Representative of these patents are U.S. Pat. No. 3,687,061 (Eggenmuller), U.S. Pat. No. 4,046,068 (Eggenmuller), U.S. Pat. No. Re 31,810 (Lee) and U.S. Pat. No. 4,337,805 (Johnson, et al).

This process works well for silage but is almost useless for filling a pliable plastic bag with grain. The rotor's teeth used for effectively force feeding silage into the bag simply slide through the more viscous grain particles. Various feed mechanisms have been tried but none have been found satisfactory and the effort to adapt the silage storing method to grain storage was abandoned.

Accordingly, an object of the present invention is to provide a machine and method that is suitable for filling large plastic pliable bags with grain.

BRIEF DESCRIPTION OF THE INVENTION

The basic problem is that grain has very limited lateral stability. It is fluent or non-viscous to a far greater extent than hay, straw or silage. Prior to this invention, there was no known grain conveying system that would push grain into a horizontally oriented bag so as to fill the bag.

The present invention solves the problem with a method that embraces the property of grain to flow freely. In brief, a mobile bag filling machine has a container provided with means for mounting a folded (gathered) bag surrounding an opening at the rear of the container. The container is provided with sufficient height so that grain can be filled to a height greater than the height of the bag when filled. A front wall of the container is rearwardly angled top to bottom and an entry for grain delivery is provided at the top of the container.

Adjustable brakes are provided to the wheels of the container (although the brake resistance is far less than that required for silage compaction). Grain is delivered into the top of the container. The fluent property of the grain produces lateral pressure against the bag bottom which is covering the opening. Similar lateral pressure is applied against the front wall. The bag end is pushed rearward until the weight of the grain in the bag that is resting on the ground resists rearward sliding of the bag. The bag continues to fill as the level in the container rises until the capacity for the unfolded portion of the bag extended from the opening is reached.

The lateral pressure applied against the front wall increases as the grain level increases in the container. This pressure urges forward movement of the machine. The brakes are set to permit movement only at the level of pressure that provides for the bag to be filled to capacity. The machine thus creeps forward as the extended portion of the bag is filled to capacity. The forward movement unfolds more of the bag and the process continues until all of the bag is unfolded and filled at which point the bag is removed from the machine and tied off.

Additional desired features are also provided. The front of the machine carries a hopper into which the grain is deposited. A grain auger, augers the grain to the entry at the top of the container. Motors, e.g. hydraulic motors, as well as controls for both the auger and brake system are mounted on the machine. An operator operating the controls can steer the machine, adjust the brake pressure as needed to maintain capacity filling, and adjust the auger speed to maintain a desired filling rate.

The invention will be more clearly understood upon reference to the following detailed description and drawings.

DESCRIPTION OF THE DRAWINGS

FIG. 2 is a side view of the machine and illustrates method of the invention;

FIG. 3 is a section view of the receiving hopper as taken on view lines 3—3 of FIG. 2;

FIG. 4 is a top view of the bagging machine as taken on view lines 4—4 of FIG. 2 but illustrating the filled bag extended from the machine;

DETAILED DESCRIPTION

Figure 1:
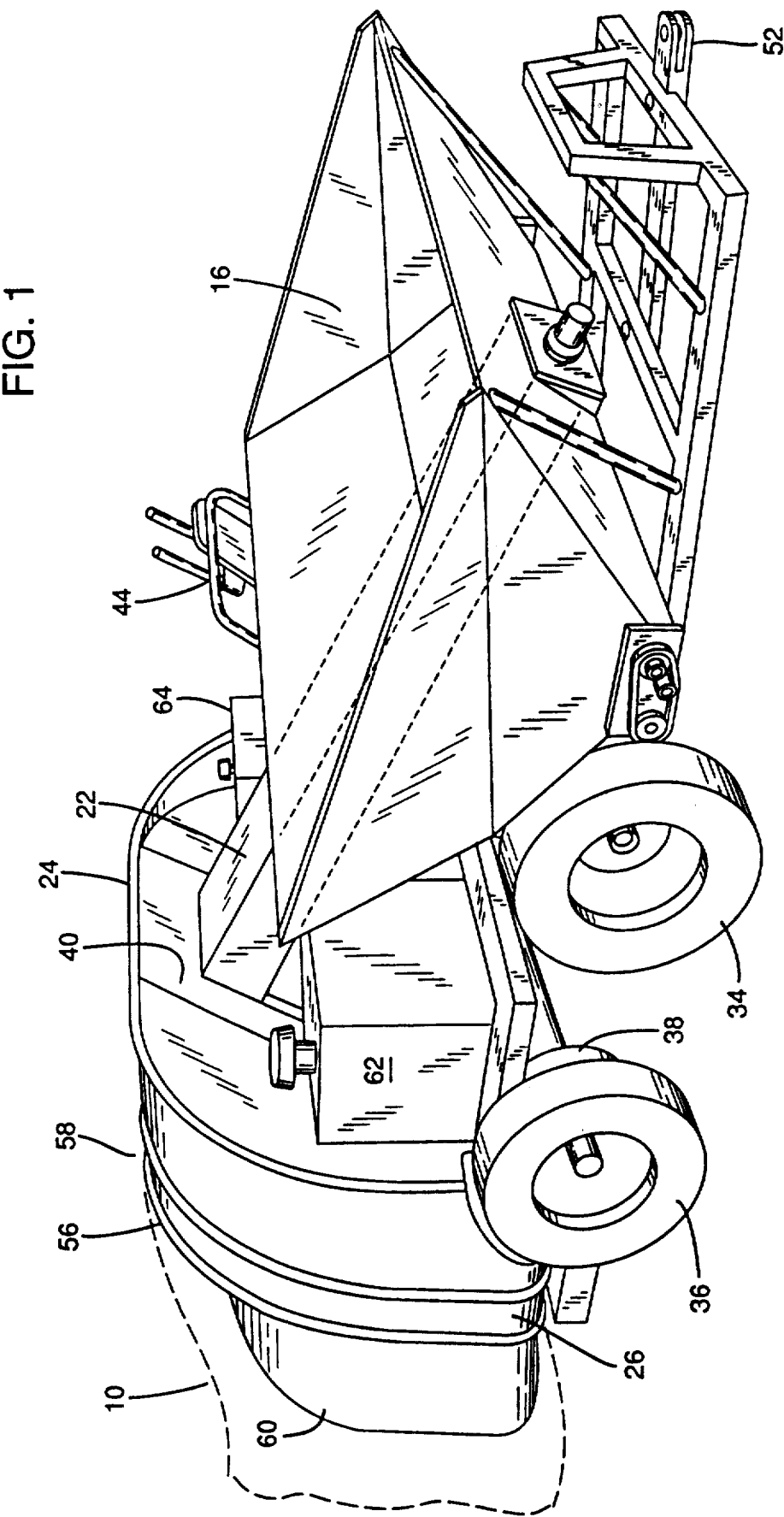
FIG. 1 is a perspective view of a grain bagging machine in accordance with the present invention.

FIGS. 1 and 2 illustrate generally the machine and the process utilized in filling a plastic bag 10 with grain 12 hauled to the bagging site, e.g. by a truck 14.

As illustrated in FIGS. 1 and 2, the machine includes a hopper 16 for receiving the grain 12. The hopper 16 is configured to direct the flow of grain toward the center of the hopper as can best be seen in FIG. 3. Side augers 18, 20, assist the flow of the grain to the center where a lifting auger 22 carries the grain into the container 24 of the machine. As illustrated in FIG. 2, the grain 12 in the container 24 builds into a pile, first flowing rearward into the tunnel 26 that defines a rear opening in the container 24, indicated by arrow 28. The pliable plastic bag 10, in gathered or folded condition is fit over the tunnel 26 with the bag bottom 30 closing the container opening 28. The closed end 30 of the bag is pushed off the tunnel and onto the ground as the grain begins to pour into the bag. As the bag begins to fill, further rearward sliding of the bag is resisted and grain is simply piled higher inside the container which flows into and fills the bag end and tunnel.

The machine is mounted on two sets of wheels, a front set of wheels 34 and a rear set of wheels 36. The wheels permit the machine to move in a forward direction (the direction of arrow 32). Wheels 36 are provided with adjustable brakes 38. The brakes are designed to resistively release when sufficient forward urging of the machine is developed. This forward urging is generated by the grain piled in the container 24 acting against the container's forward wall 40.

Forward wall 40 is preferably angled rearwardly, illustrated in the drawing as angle alpha. Whereas the wall 40 being angled is believed to enhance the forward thrust applied to the machine, the precise angle is variable. The wall 40 being angled has a secondary benefit and that is that the container 24 is more completely and easily emptied by reducing the cross section of the container near the bottom. A preferred angle for the wall 40 is within an angular range of about 45 degrees to 65 degrees.

The brake pressure applied to the brakes 38 of wheels 36 also will vary. The primary concern and controlling factor is the satisfactory filling of the bag. As the brake release pressure is adjusted downwardly, the maintained level of the pile in the container 24 will lower, whereas increased brake release pressure causes the maintained level to rise.

The bag 10 is filled when the pile 12 rises to a height that exceeds the height of the filled bag. The configuration of the top of pile 12 is domed and the desired height on wall 40 is substantially the same height as the filled bag. The operator of the machine may prefer to simply check the bag to determine when he has achieved the desired brake pressure, adjusting the brake pressure accordingly. However, preferably the operator is provided with an indicator which determines the position of the pile level on wall 40. A small window 42 can be provided in wall 40 to enable the operator to visually observe the pile height. This is deemed preferable although it is recognized that a sensor may be positioned at the desired height to sense the pressure of the grain pile at the desired level, and provide automatic adjustment of the level of brake resistance in response thereto.

The brakes 38, as explained, are preferably mounted to wheels 36 located on each side of the machine. Controls for adjusting the brakes are provided at the operator station on a control panel 44. The two brakes are preferably independently adjustable which provides limited steering control of the vehicle by the operator.

Also, as previously explained, grain from the hopper or bin 16 is carried from the hopper to the container 24 by a grain auger 22. Within the hopper bin, augers 18 and 20 direct the grain from the hopper sides to the center. One benefit of the side augers 18 and 20 is that on occasion a mixture of grains is desirable and the hopper can be set u to receive a different type of grain at each side of the hopper. The hopper may be separated by a center baffle which is not shown in the figure. The different grains can be fed at different rates into the elevator auger 22. This is permitted by separate controls for the augers controlled by the operator from control panel 44.

Adjustability in the height of the hopper 16 is also desirable. With reference to FIGS. 2 and 4, lifting jacks 46 are mounted between the axle of wheels 34 and support for the bin 16. The bin 16 is thus raised and lowered relative to the wheels 34. Such raising and lowering is desirable to fit the forward edge 48 of the hopper bin to the height of the truck box (FIG. 2). A further benefit of this bin height adjustability is to enable easy hookup of the machine for towing.

Note the hitch 52 at the front of the machine in FIG. 2. It is shown in the figure as attached to the machine during the bag filling operation. However, it is considered preferable to make the hitch 52 removable for removal during the filling operation. In any event, before towing the hitch 52 of the machine will likely be misaligned with the hitch 54 of the truck and must be raised into alignment before the hitches ca be engaged. In order to achieve this alignment, the hopper 16 is raised by jacks 46. The hitches 52, 54 are connected and jacks 46 are reversed to draw the wheels up under the hopper 16 for towing. Controls for raising and lowering the jacks are provided on control panel 44.

Figure 5:
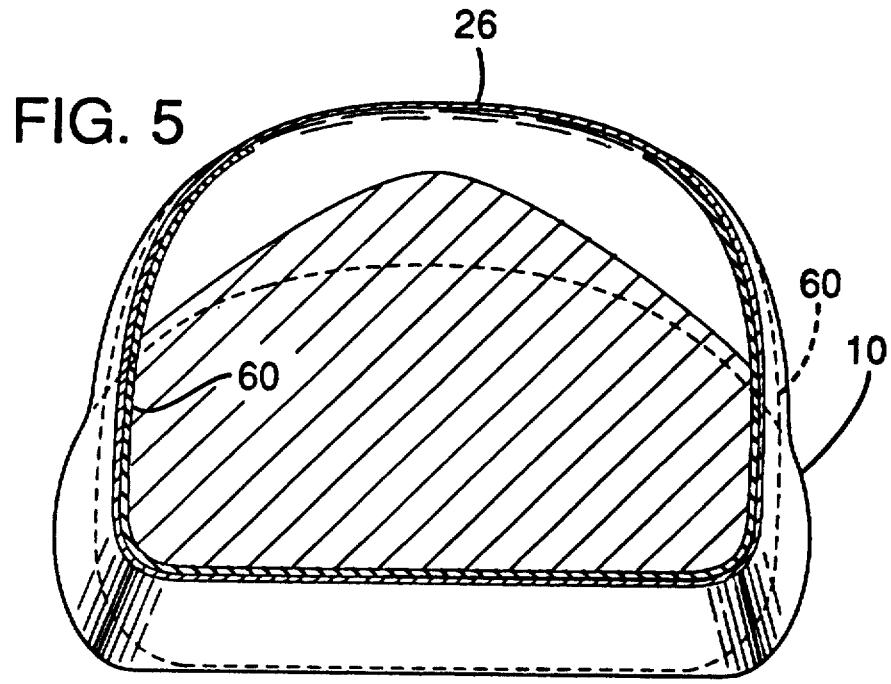
FIGS. 5 and 6 are section views of the bag and bag liner as taken on view lines 5—5 and 6—6, respectively, of FIG. 4.
Figure 6:
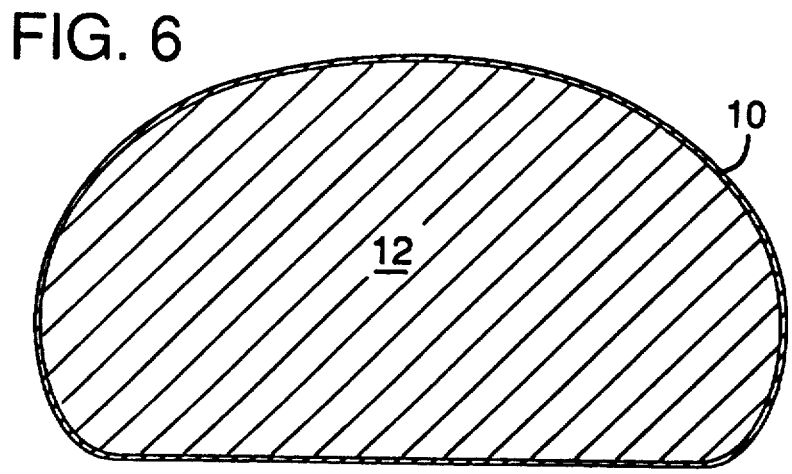

Referring now to FIGS. 4-6, as previously explained the tunnel 26 functions to retain the folded bag 10. It is adequately retained on the tunnel by an elastic cord 58 (sometimes referred to as a bunge cord) wrapped over the bag and around the tunnel. A bead 56 forward on the periphery of the tunnel exterior cooperates with the elastic cord 58 to generate sufficient sliding resistance of the bag to prevent inadvertent withdrawal of the bag. The resistance does not prevent the bag from being pulled off by the pressure of the filling operation as illustrated in FIG. 1.

Figure 7A:
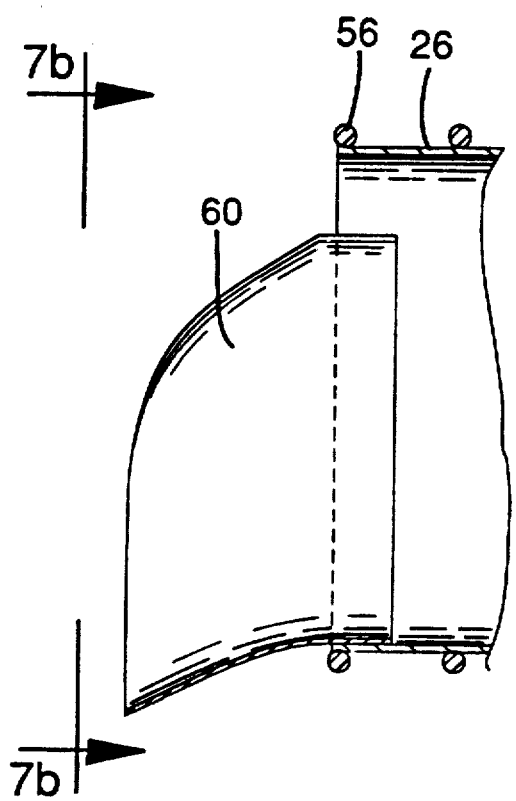
FIGS. 7a and 7b are views showing the configuration of the bag liner as the grain being bagged flows out of the machine and into the bag.
Figure 7B:
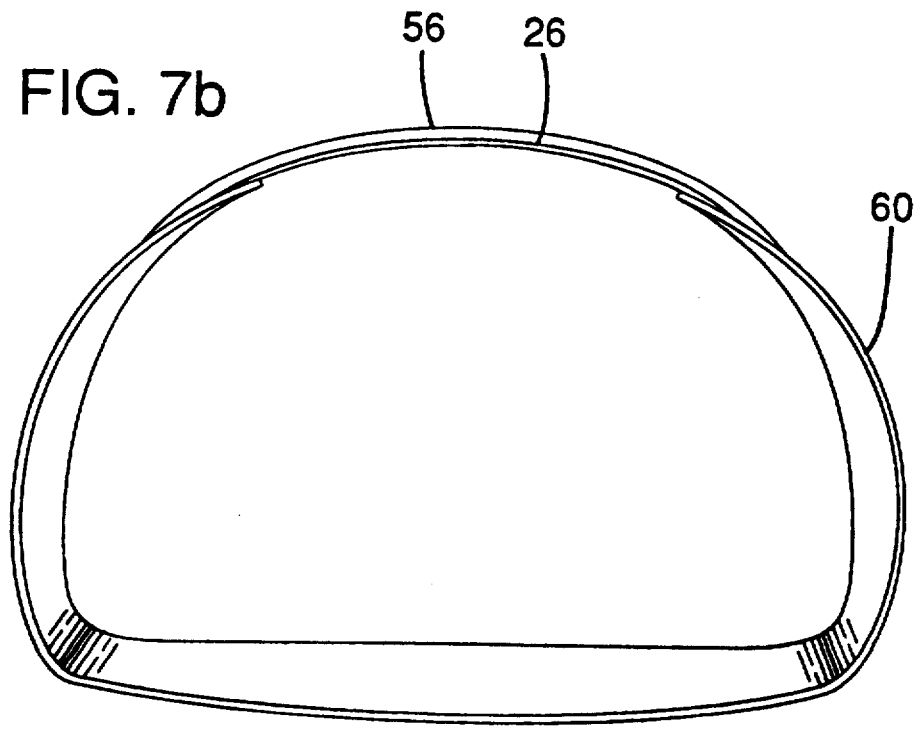

Whereas the tunnel 26 is generally cylindrical in shape, the filled bag spreads and assumes an elliptical shape. FIGS. 5 and 6, which are section views as noted in FIG. 4, illustrate the transformation in the bag shape from cylindrical to elliptical as the bag moves off of and away from the tunnel 26. This transformation, together with the fluent nature of the grain, creates a back flow of the grain that tends to seek and find a path along the outside of and between the tunnel and the bag and then onto the ground. This undesired back flow of the grain is largely eliminated by the provision of a boot or liner 60 that is attached to the tunnel wall and extends rearward into the filled bag. FIGS. 7a and 7b illustrate this liner 60. The liner is a heavy pliable material such as rubber that conforms to transformation of the bag configuration from cylindrical shape to elliptical shape. The liner seals against the bag and inhibits grain from finding a path between the bag and tunnel exterior. The liner can also be seen in outline form in FIG. 5.

Whereas the above adequately describes a working embodiment of the invention, a number of variations are possible. A modification that is presently contemplated concerns the under carriage and specifically the supporting wheel sets indicated in the figures as wheels 34 and 36.

It is frequently desirable to provide a machine such as the grain bagger with self-propulsion. As contemplated, the wheels 36 are provided without the brakes 38 and function as idler wheels. The front wheels 34 are the equivalent of the front end wheels of a four-wheel drive three-quarter ton pickup which is precisely what has been used to build a prototype. The front end axle arrangement provides both braking ability and steering ability. The front wheel drive is provided with the transmission unit as well as the lock out hubs of the front wheel drive of the pickup. The transmission is hooked up to a hydraulic motor which provides the self-propulsion.

The above-described machines have numerous moving parts requiring motors, hydraulics and the like. These components are well known to the art and are not detailed herein. It is sufficient to point out that the machine is substantially self-sufficient with all components such as motors 62 and hydraulic fluid storage tanks 64 preferably mounted to the chassis of the machine between the bin and the container. Numerous variations and modifications will be readily apparent to those skilled in the art without departing from the invention which is defined in the claims appended hereto.

We claim:

1. A machine for bagging fluent grain comprising;
a mobile chassis having a forward direction of movement,
a grain receiving container mounted on said chassis, said grain receiving container having a front wall that receives forward induced pressure from grain that is piled in the container and a rearwardly extended tunnel portion defining a rear opening, means associated with said tunnel portion for holding a pliable bag in a gathered condition surrounding the tunnel and opened to the rear opening for filling the bag with grain from said container, said holding means providing for incremental withdrawal of the gathered bag for extension thereof behind the tunnel,
a grain conveyor having an inlet end and an outlet end mounted on said chassis, said outlet end located in said container, said conveyor receiving and conveying grain to the container for depositing the grain into the container at a height within the container above the overall height of that portion of the bag filled with the grain throughout operation, to pile the grain in the container in a dome below the outlet end of the conveyor and as induced by gravity, the grain flows from the top of the pile into the bag and toward the front wall, urging forward movement of the container, and
adjustable brake means for resistively permitting forward movement of the chassis whereby said brake means resistance is established relative to pressure applied to said front wall of the container for providing a flow of grain through the tunnel to fill the pliable bag.

2. A grain bagging machine as defined in claim 1 wherein said conveyor includes an open top grain receiving bin at an elevation to receive grain from trucks and including a grain transporting elevator for elevating grain from the bin to the desired height of deposit into said container.

3. A grain bagging machine as defined in claim 2 wherein the elevator of said conveyor is a grain auger that transports grain from a bottom center position of said bin to the container, and a side auger on each side of the bottom center portion for moving grain from the bin sides to the center position.

4. A grain bagging machine as defined in claim 3 including an operator station on said chassis, and controls for controlling the rate of movement by said augers, said controls located for control by an operator at said operator station.

5. A grain bagging machine as defined in claim 1 wherein said front wall of said container is inclined from back to front to enhance the application of forward induced pressure from rain that is piled in the container.

6. A grain bagging machine as defined in claim 5 wherein the angle of incline ranges between about 45 degrees and 65 degrees.

7. A grain bagging machine as defined in claim 2 including means for adjusting the brake resistance and further including means for determining the height of the grain level on said front wall and for comparing that height with the rear opening height to thereby determine the desired adjustment of said brake resistance.

8. A grain bagging machine as defined in claim 7 including an operator station on said chassis, and controls for controlling the brake adjusting means that is located at said operator station.

9. A grain bagging machine as defined in claim 7 wherein the chassis is mounted on a pair of forward wheels located on each side and under the bin and on a pair of rearward wheels on each side and under the container, said rearward wheels each provided with independently operable brake means, and control means for each brake means at said operator station to adjustably brake the forward movement and by selectively braking the wheels to provide limited steering of the forward movement of the machine.

10. A grain bagging machine as defined in claim 9 wherein a jack is provided between said front wheels and said bin for raising and lowering said bin relative to said front wheels.

11. A grain bagging machine as defined in claim 10 including a trailer hitch provided at a forward position on said machine for connection to a trailer hitch of a tow vehicle for roadway towing of said machine from site to site, said jack functioning to raise and lower said trailer hitch for aligning the hitch with the tow vehicle and to raise the wheels off the ground following hitch connection.

12. A grain bagging machine as defined in claim 1 wherein a liner of tough pliable material is attached to and extends rearwardly of said tunnel and into the unfolded bag portion, said liner conforming to the change in configuration of the bag from the tunnel shape to the shape dictated by the inner pressures of the contained grain and thereby sealing and preventing leakage of grain.

13. A grain bagging machine as defined in claim 1 including a pair of wheels on which the chassis is supported and which provides direction therefor, said wheels substantially similar to the front wheels of a four-wheel drive vehicle including a hydraulic drive transmission for driving the wheels, brake mechanism for braking the wheels and steering mechanism for steering the wheels and accordingly the machine.

14. A method of filling a large pliable bag with fluent grain from a mobile grain container having a front wall and a rear opening which comprises;

attaching an open end of a pliable bag over the rear opening and gathering the bag so that the bottom end of the bag covers the opening, determining the height of that portion of the bag filled with grain, providing a grain conveyor having an inlet end and an outlet end, said outlet end located in said container, filling the container by depositing fluent grain from said grain conveyor within said container to form a domed pile having a height that exceeds said determined height of the filled bag and continuing to fill the bag above said dome to urge forward movement of the container by gravity flow of the grain from the domed pile into the bag and against the front wall, resistively braking the forward movement of the container as induced by the grain pushing against the front wall, said braking established to hold the level of grain in the container to a height above the filled bag.

* * * * *